though the use of these materials.

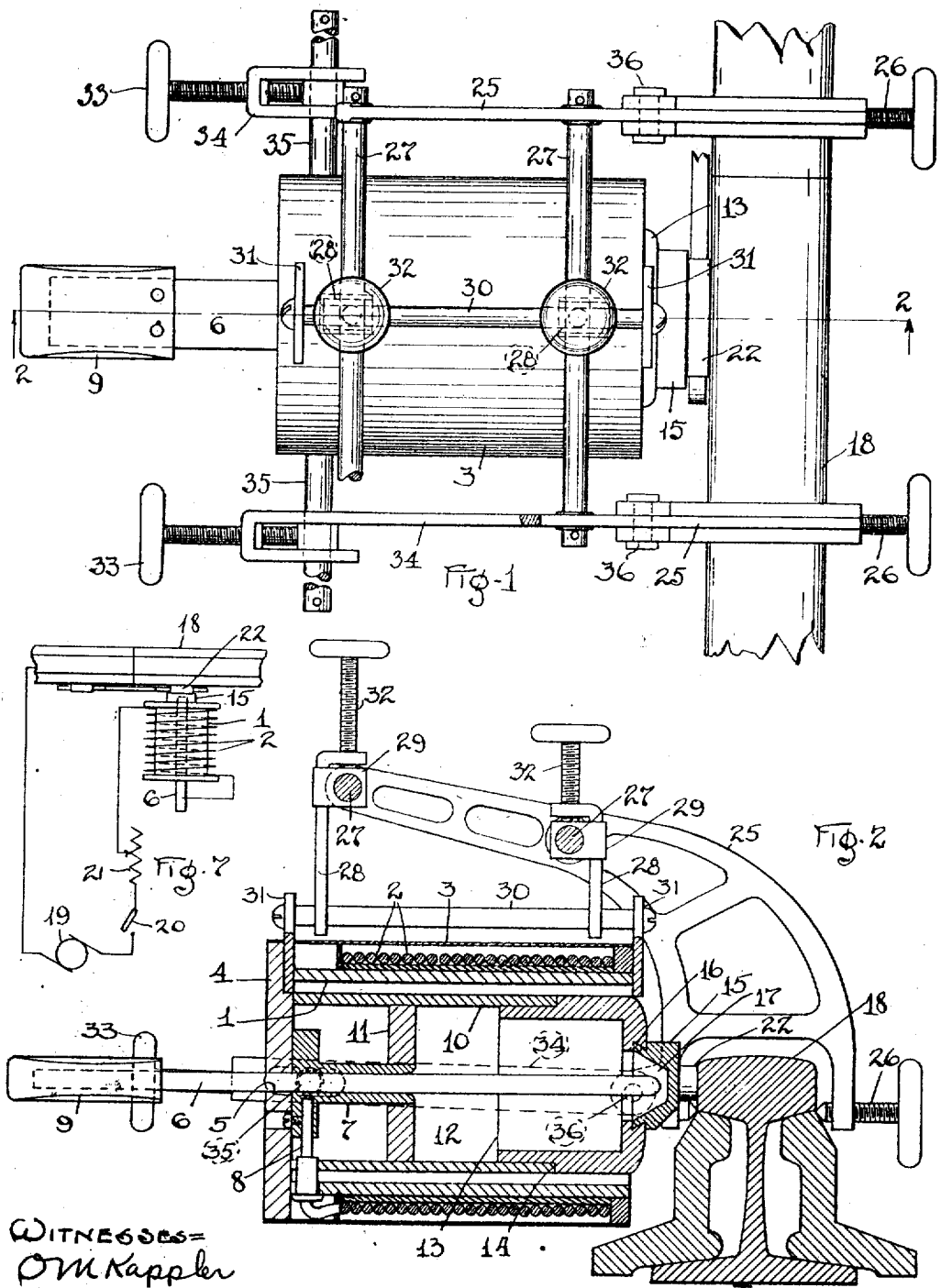

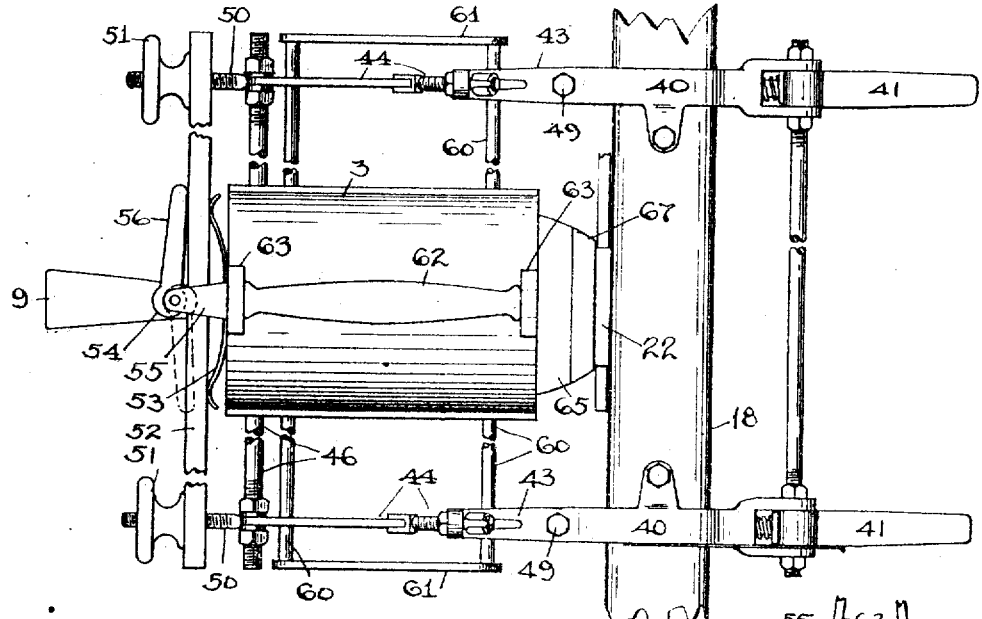
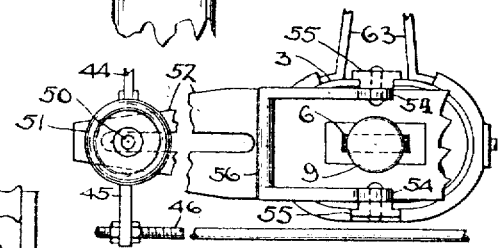
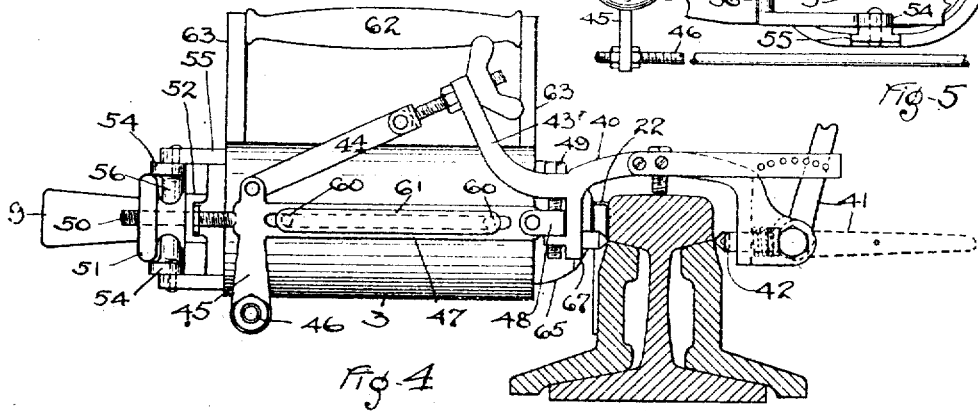
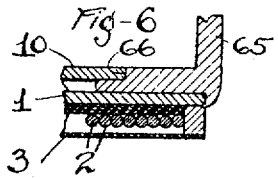

UNITED STATES PATENT OFFICE.

JOHN G. KJELLGREN, OF BROOKLYN, NEW YORK, AND GEORGE H. STEPHENSON, OF CLEVELAND, OHIO, ASSIGNORS TO THE ELECTRIC RAILWAY IMPROVEMENT COMPANY, OF CLEVELAND, OHIO, A CORPORATION OF OHIO.

METHOD OF ELECTRIC WELDING AND APPARATUS FOR USE THEREIN.

1,309,947.  Specification of Letters Patent.  Patented July 15, 1919.

Application filed December 14, 1916. Serial No. 136,831.

*To all whom it may concern:*

Be it known that we, JOHN G. KJELLGREN, a subject of the King of Sweden, and resident of borough of Brooklyn, county of Kings, State of New York, and GEORGE H. STEPHENSON, a citizen of the United States, and resident of Cleveland, county of Cuyahoga, and State of Ohio, respectively, have jointly invented a new and useful Improvement in Methods of Electric Welding and Apparatus for Use Therein, of which the following is a specification, the principle of the invention being herein explained and the best mode in which we have contemplated applying that principle, so as to distinguish it from other inventions.

The present improved method and apparatus constitute, in certain respects, an improvement on the method and apparatus disclosed in the pending application of Charles A. Cadwell, filed June 19, 1915, Serial No. 35,081. Thus one of the objects of the present invention is the provision of an apparatus whereby current of relatively high voltage may be utilized, so that, for example, in welding rail-bonds onto rails, current of the voltage regularly used in the operation of the railways may be taken directly from the trolley through a minimum amount of resistance. Heretofore, in operations of this sort, it has been found necessary to utilize an electrode of high resistance material, bringing the same to the proper high temperature by passing therethrough a current of relatively low voltage and large amperage. By the present process, however, instead of relying upon the resistance of such an electrode, we utilize the electric arc which, as is well understood, will require a considerably higher voltage than that just indicated for such resistance electrode.

In employing the electric arc, however, in welding operations, particularly where the bodies are of unlike mass, and where in addition there may be a disparity in the temperatures of fusion, the smaller mass, for example, having both the lower temperature of fusion and the greater heat conductivity, an ordinary arc, as is well understood, cannot be successfully employed, as it will fuse or burn such smaller body long before the contacting face of the larger body is brought to a welding temperature; or at least if the parts are welded together at all, they are thus united only at a few points instead of uniformly throughout their contact surfaces, as is desirable, particularly in a rail-bonding operation, where the object is to provide an adequate and at the same time permanent electrical connection across the joint between two rails.

The object of the present invention, accordingly, is to provide, first of all, a method, and means for utilization therewith, whereby the heating effect of the arc may be so regulated and controlled as to affect uniformly a considerable area and thus enable, for example, a bond terminal and adjacent face of the rail, wherewith it is in contact, to be brought practically simultaneously to a proper welding or brazing temperature. A further object is to provide a simple and compact apparatus, which may be readily carried about, and which will interfere as little as possible with the use of the rails for traction purposes.

To the accomplishment of the foregoing and related ends, the invention, then, consists of the steps and means hereinafter fully described and particularly pointed out in the claims, the annexed drawings and the following description setting forth in detail certain mechanism and steps embodying the invention, which, however, constitute but several of the various ways in which the principle of the invention may be used.

In said annexed drawings:—

Figure 1 is a plan view of an apparatus adapted for the carrying out of our present improved method, more especially in connection with the operation of applying bonds to rails; Fig. 2 is a central longitudinal section of such apparatus, taken on the plane indicated by the line 2—2, Fig. 1; Fig. 3 is a plan view similar to that of Fig. 1, but showing a modified construction of the apparatus; Fig. 4 is a side elevational view of such modified construction; Fig. 5 is a broken rear elevation of such modified construction; Fig. 6 is a central longitudinal section of a portion of the same, corresponding with the lower right-hand corner of Fig. 2; and Fig. 7 is a diagrammatic illustration of the apparatus showing the circuit connections therefor.

Referring to the first of the several illustrative forms of apparatus shown in the aforesaid drawings as adapted for the carrying out of our improved method, it will be noted that the main structural member of the apparatus is a hollow metal core, or magnetic shell, 1 (Fig. 2). Surrounding such core or shell, is a coil 2, consisting of a suitable conductor, wound in the form of a helix. This coil is of course suitably insulated and is in turn surrounded by a light casing 3 of metal, or other suitable material, which serves to inclose and protect the coil.

The rear end of core 1 is closed by means of a plate 4 of substantial thickness, affixed thereto, such plate being of suitable non-conducting material, such as asbestos, composition, or the like, and being furthermore provided with a central aperture 5, through which an electrode 6 consisting of a rod or bar of graphite, may be inserted. A tubular extension 7, attached to the inner face of the plate 4, provides a bearing, in which such electrode may be slidably supported, and also constitutes an electrical connection between such electrode and the one terminal 8 of the coil 2. Said electrode has a handle 9 of wood or like material attached to its rear end, by means of which it may be advanced or withdrawn, as desired.

Supported from the same plate 4, is a second metal core, or magnetic shell, which is spaced a slight distance from the latter and terminates some distance short of the front end thereof, as clearly illustrated in Fig. 2. This inner core is additionally supported by means of an annular plate 11 of the same material as the rear closure plate, mounted on the inner end of the tubular extension 7, said plate 11, at the same time, serving as a partition, or rear wall, for a central chamber 12 in the apparatus.

The front portion of this chamber 12 is formed by a shell or casing 13 of graphite or other suitable material. Said shell or casing 13 is fitted in the forward end of the inner core 10, being preferably provided with an external shoulder 14 that abuts against such core, the front end of the shell lying substantially flush with the front end of the outer core 1. This end of the shell is closed, the closure in part consisting preferably of a removable section, or block 15 of the same material as the shell itself, that is dovetailed into a transverse groove 16 in the outside face of the shell-end. The interior of this end, whether of sectional construction or integral, is hollowed out so as to provide a supplemental chamber 17 into which the extreme forward end of the electrode 6 is designed to project when in its operative position (Fig. 2).

The coil 2 is preferably included in series with the electrode, the arrangement of the circuit being diagrammatically shown in Fig. 7, where the return, it will be observed, is through the rail 18 to the generator 19, which is illustrated as of D. C. type. A suitable switch 20 will, of course, be included in the circuit at a point convenient to the apparatus, as also a resistance 21 of any suitable construction, whereby the voltage may be brought down and regulated.

In use, the apparatus as thus described, is designed to be supported so as to bring the outer face of the graphite block 15, which constitutes the front end of the shell 13, in proper contactual relation with the bond terminal 22, or other part to be welded, pressing against the same with sufficient force to hold it in turn in proper contact with the juxtaposed face of the rail 18, or other second body.

In order to thus support the apparatus, various means may be provided, those illustrated in Figs. 1 and 2 being specially designed for the field of use referred to, and consisting of two arms or brackets 25, the lower ends of which are adapted to be securely clamped to the rail by means of set-screws 26 of substantial construction, provided with hand-wheels, as clearly shown in Figs. 1 and 2. The free ends of the brackets 25, when thus in place on the rail, project upwardly and outwardly, and are connected by means of two transverse rods or bars 27, constituting of the whole a more or less rigid framework. Arms 28 slidably attached to these rods, respectively, by means of clips 29, serve to pivotally support a third rod 30 disposed longitudinally of the core 1, and its inclosing shell 3, being attached to the respective ends thereof by means of plates 31, as will be readily understood. Handled set-screws 32 threaded in the upper ends of the arms which are bent so as to over-lie the rods, may be utilized to raise or lower such arms, independently of each other, in order to correspondingly raise or lower the adjacent end of the device. At the same time, the latter may be bodily moved transversely of the rods through a space equal to the sum of the distances between the arms and the adjacent ends of the rod, while by reason of the pivotal character of the connection with the bracket arms 25, the device will naturally tend to hang in a vertical position.

In order to retain the device in adjusted position along the rods 27, clamp screws 33 furthermore are provided, these being threaded in the outer ends of bars 34 that are slidably fitted on guides 35 projecting laterally from the casing 3 of the device, while the inner ends of such bars are pivotally attached to the brackets 25 about axes 36 parallel with rods 27.

The modifications in construction illustrated in Figs. 3, 4 and 5 relate principally to the means provided for supporting the device including the core 1 and attached parts. Instead of brackets 25, as in the first-described form of apparatus, clamps 40 for engaging the rail 18 are provided, each consisting of a U-shaped member, one arm of which carries a handled lever 41 adapted to press a pointed plunger 42 into contact with the side of the rail opposite to the one to which the bond is to be affixed. The other arm of each clamp is formed with a projection 43 that extends outwardly and upwardly from the rail, and is connected through the medium of a link 44 of adjustable length, with frame members 45 that are in turn joined together by means of a transverse bar, or rod 46 disposed below the shell of the welding device proper. These members 45 include slotted extensions, the inner ends of which are pivotally attached to blocks 48 vertically adjustable on the arms of the clamps 40 that lie on the adjacent side of the rail heads, set-screws 49 in such arms having threaded engagement with these blocks to raise or lower the same within prescribed limits.

The frame members 45 also include threaded extensions 50, upon which are mounted hand-wheels 51 that are slidably held in the oppositely extending slotted arms of a plate 52 disposed transversely of the rear end of the welding device and connected therewith in the following manner as best shown in Fig. 5, viz: A flat spring 53 is interposed between the rear closure plate of the device and this bar, and tends to press the device forwardly away from the latter, such movement being limited by means of cams 54 pivotally attached to ears 55 on the rear end of the device, and joined by a U-shaped handle 56 which may be made of length sufficient to clear the electrode handle 9, if desired.

As illustrated in Fig. 3, the device is shown in its forward operative position, where it is held by the action of the compression spring 53, but by swinging the handle 56 to the opposite side, as illustrated in dotted outline, the device will be withdrawn slightly; sufficiently, in other words, to clear the bond terminal 22, for the purpose presently to be described.

The device is supported in the frame members 45, so as to be capable of this slight movement longitudinally of its axis by means of laterally extending rods or bars 60, two on each side, which lie in the slots in the extensions 47 of said bars, the outer ends of these rods being connected by transverse bars 61 for the sake of rigidity, as will be readily understood.

To further assist in the manipulation of the device, as also for carrying the same from one place to another, a handle 62 is attached thereto so as to extend longitudinally above the same by means of arms 63 rising from each end thereof.

The interior of the welding device proper may also be modified, as shown in Fig. 6, by fitting the graphite shell 65 outside instead of inside of the inner core 10. In such case the shell, in effect, is fitted between the two cores 3 and 10, having a shoulder 66 on its inner face that abuts with the forward end of such inner core. A separate graphite block 67 preferably forms the contact face of the shell, as before.

The general mode of operation is the same in the case of both forms of the apparatus; in other words, the supporting frame is attached to the rail by means of the clamping device hereinbefore described, a bond is held or otherwise temporarily attached to the side of the rail, with its terminals in place, and the welding device is then adjusted on its supporting frame so as to bring the forward contacting face of the graphite block 15 or 67 opposite such terminal. Thereupon the device is moved forwardly so as to press such block more or less forcibly against the terminal, and at the same time, or immediately thereafter, the current is turned on by closing the switch. Assuming the electrodes 6 to be properly adjusted, this adjustment being directly affected by moving it in or out by medium of the handle 9 on its rear end, an arc is established between the front end of such electrode and the graphite block, and the portion of the latter which contacts with the bond, becomes rapidly heated to the point of incandescence. As a result, the bond terminal in turn becomes heated and the heat being conducted therefrom to the adjacent rail face, the contacting surfaces of the two are brought to a temperature at which they may be welded or brazed together.

During the operation just described the electrode may be advanced until an electric arc is established between its forward end and the heat distributing plate, and the character of such arc will of course be varied to some extent by the degree of proximity of the parts just named, which may be varied by further advancing or withdrawing such electrode. At all times, however, the coil, in conjunction with the outer and inner cores or magnetic shells, properly arranged in regard to size and relative position, will create a magnetic field so directed that its influence will change the characteristic of the arc, steady the same, insure uniform heating of said heat distributing plate, and prevent the arc from shifting or striking over to the side walls of the inclosing chamber or graphite shell.

As soon as the welding of one terminal has been completed, the device is withdrawn slightly either by turning the hand wheels 33, in the first-described form of the device (Figs. 1 and 2), or by swinging the handle 56 to the dotted position indicated in Fig. 3 in the second form. Thereupon, the heating device, proper, can be shifted along the supporting frame a sufficient distance to bring the block 15 opposite the other bond terminal, and the block be then pressed against such terminal until it in turn has been welded, or blazed, to the rail. It will be evident from the foregoing, that one setting of the supporting frame will serve for several successive welding operations, providing these be spaced within the limits of the device's transverse adjustment.

Other modes of applying the principle of our invention may be employed instead of the one explained, change being made as regards the steps or mechanism herein disclosed, provided the means stated by any of the following claims or the equivalent of such stated means be employed.

We therefore particularly point out and distinctly claim as our invention:—

1. In apparatus of the character described, the combination of means for forming an electric arc; and means for controlling such arc, including an electro-magnetic coil and a plurality of cores for such coil.

2. In apparatus of the character described, the combination of means for forming an electric arc; and means for controlling such arc, including an electro-magnetic coil and a plurality of cores, consisting of shells of magnetic material, for said coil.

3. In apparatus of the character described, the combination of means for forming an electric arc; and means for controlling such arc, including an electro-magnetic coil and a plurality of cores, consisting of shells of magnetic material, one within the other, for said coil.

4. In apparatus of the character described, the combination of means for forming an electric arc; and means for controlling such arc, including an electro-magnetic coil disposed with its axis in substantial alinement with such arc, and a plurality of similarly disposed tubular cores for said coil.

5. In apparatus of the character described, the combination of means for forming an electric arc; and means for controlling such arc, including an electro-magnetic coil disposed with its axis in substantial alinement with such arc, and two similarly disposed tubular cores for such coil, one such core lying within and spaced from the other.

6. In apparatus of the character described, the combination of means for forming an electric arc; and means for controlling such arc, including an electro-magnetic coil disposed with its axis in substantial alinement with such arc; a similarly disposed tubular core within said coil and approximately co-extensive therewith; and a second shorter core lying within and spaced from said first core.

7. In apparatus of the character described, the combination of means for forming an electric arc; and means for controlling such arc, including an electro-magnetic coil disposed with its axis in substantial alinement with such arc; a similarly disposed tubular core within said coil and approximately co-extensive therewith; and a second shorter core lying within, spaced from, and terminating short of the front end of said first core.

8. In apparatus of the character described, the combination of a heat-distributing plate adapted to contact with the article to be heated; means for directing an arc against such plate; and means for spreading such arc over the surface of said plate, said means including an electro-magnetic coil, and a plurality of cores for said coil.

9. In apparatus of the character described, the combination of a heat-distributing plate adapted to contact with the article to be heated; means for directing an arc against such plate; and means for spreading such arc over the surface of said plate, said means including an electro-magnetic coil, and a plurality of cores, consisting of shells of magnetic material, for said coil.

10. In apparatus of the character described, the combination of a heat-distributing plate adapted to contact with the article to be heated; means for directing an arc against such plate; and means for spreading such arc over the surface of said plate, said means including an electro-magnetic coil, and a plurality of cores, consisting of shells of magnetic material, one within the other, for said coil.

11. In apparatus of the character described, the combination of a heat-distributing plate adapted to contact with the article to be heated; means for directing an arc against such plate; and means for spreading such arc over the surface of said plate, said means including an electro-magnetic coil disposed with its axis in substantial alinement with such arc, and a plurality of similarly disposed tubular cores for said coil.

12. In apparatus of the character described, the combination of a heat-distributing plate adapted to contact with the article to be heated; means for directing an arc against such plate; and means for spreading such arc over the surface of said plate, said means including an electro-magnetic coil disposed with its axis in substantial alinement with such arc, and two similarly disposed tubular cores for such coil, one such core lying within and spaced from the other.

13. In apparatus of the character described, the combination of a heat-distributing plate adapted to contact with the article to be heated; means for directing an arc against such plate; and means for spreading such arc over the surface of said plate, said means including an electro-magnetic coil disposed with its axis in substantial alinement with such arc; a similarly disposed tubular core within said coil and approximately co-extensive therewith; and a second shorter core lying within and spaced from said first core.

14. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a core within said coil approximately co-extensive therewith; and a second core lying within, spaced from, and terminating short of the front end of said first core.

15. In apparatus of the character described, the combination of a heat-distributing plate adapted to contact with the article to be heated: an electrode adjustable toward and from said plate and adapted to direct an arc thereagainst; an electro-magnetic coil concentric with said electrode but lying to the rear of said plate; a core within said coil approximately co-extensive therewith; a second core lying within, spaced from, and terminating short of said first core; and a shell, forming a heating chamber, interposed between the front end of said second core and said plate.

16. In apparatus of the character described, the combination of a heat-distributin plate adapted to contact with the article to be heated; an electrode adjustable toward and from said plate and adapted to direct an arc thereagainst; an electro-magnetic coil concentric with said electrode but lying to the rear of said plate; a core within said coil approximately co-extensive therewith; a second core lying within, spaced from, and terminating short of said first core; and a shell, forming a heating chamber fitted onto the front end of said second core, said plate being supported by said shell.

17. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a core within said coil approximately co-extensive therewith; a second core lying within, spaced from, and terminating short of said first core; and a shell, forming a heating chamber fitted onto the front end of said second core, said plate being removably attached to, so as to be supported by, said shell.

18. In apparatus for bonding rails, or the like, the combination with a heating device including a plate adapted to contact with a bond terminal, and an electrode having one end adjacent said plate; of means adapted to support said device with said plate in such contacting position, said means including a clamp adapted to engage a rail and adjustable connections between said clamp and device.

19. In apparatus for bonding rails, or the like, the combination with a heating device including a plate adapted to contact with a bond terminal, and an electrode having one end adjacent said plate; of means adapted to support said device with said plate in such contacting position, said means including a clamp adapted to engage a rail and adjustable connections between said clamp and device adapted independently to advance or retract said plate and to raise or lower the same with respect to the rail.

20. In apparatus for bonding rails, or the like, the combination with a heating device including a plate adapted to contact with a bond terminal, and an electrode having one end adjacent said plate; of means adapted to support said device with said plate in such contacting position, said means including two spaced clamps adapted to engage a rail, bars connecting said clamps and slidably attached to said device, and adjusting screws adapted independently to advance or retract said plate and to raise or lower the same with respect to the rail.

21. In a method of uniting contacting metal bodies, the steps which consist in holding a heat-distributing plate under pressure against one such body, establishing an arc between such plate and an adjacent electrode-member, and subjecting such arc to the influence of the magnetic field produced by an electro-magnetic coil adjacent to and co-axial with such arc, such coil having two cores one within and spaced from the other.

22. In a method of uniting contacting metal bodies, the steps which consist in holding a heat-distributing plate under pressure against one such body, establishing an arc between such plate and an adjacent electrode member, and subjecting such arc to the influence of the magnetic field produced by an electro-magnetic coil adjacent to and coaxial with such arc, such coil having two cores one within, spaced from, and terminating short of the other.

Signed by us, this 8th day of December, 1916.

JOHN G. KJELLGREN.
GEORGE H. STEPHENSON.

Attested by—
 WM. E. HUBER,
 W. VAN NOSTRAN.